(12) United States Patent
Kim

(10) Patent No.: US 11,040,675 B2
(45) Date of Patent: Jun. 22, 2021

(54) VEHICLE AND POWER CONTROLLER

(71) Applicants: HYUNDAI MOTOR COMPANY, Seoul (KR); KIA MOTORS CORPORATION, Seoul (KR)

(72) Inventor: Jin Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 521 days.

(21) Appl. No.: 15/832,501

(22) Filed: Dec. 5, 2017

(65) Prior Publication Data

US 2019/0092256 A1 Mar. 28, 2019

(30) Foreign Application Priority Data

Sep. 22, 2017 (KR) ........................ 10-2017-0122313

(51) Int. Cl.
| | |
|---|---|
| *B60R 16/023* | (2006.01) |
| *H04B 3/54* | (2006.01) |
| *H02J 1/14* | (2006.01) |
| *B60R 16/033* | (2006.01) |
| *B60R 16/03* | (2006.01) |

(52) U.S. Cl.
CPC ........ *B60R 16/0231* (2013.01); *B60R 16/033* (2013.01); *H02J 1/14* (2013.01); *H04B 3/548* (2013.01); *B60R 16/03* (2013.01); *H04B 2203/547* (2013.01)

(58) Field of Classification Search
CPC .......... B60R 16/033; B60R 16/03; H02J 1/14; H04B 3/548

USPC ............................................. 307/9.1, 10, 18
See application file for complete search history.

(56) References Cited

U.S. PATENT DOCUMENTS

| | | | |
|---|---|---|---|
| 8,450,882 B2* | 5/2013 | Anjima | B60Q 11/007 307/131 |
| 9,533,635 B2 | 1/2017 | Nobauer et al. | |
| 2002/0084786 A1* | 7/2002 | Egami | B60Q 11/00 324/503 |
| 2013/0140883 A1* | 6/2013 | Tawada | H02J 13/00016 307/9.1 |
| 2015/0349471 A1* | 12/2015 | Maki | B60R 16/0215 307/10.1 |
| 2018/0334014 A1* | 11/2018 | Nakasako | B60L 1/02 |

FOREIGN PATENT DOCUMENTS

| | | |
|---|---|---|
| JP | 2002-200948 A | 7/2002 |
| JP | 2004-142662 A | 5/2004 |
| JP | 2005-218171 A | 8/2005 |
| JP | 2007-099065 A | 4/2007 |

(Continued)

*Primary Examiner* — Hal Kaplan
*Assistant Examiner* — Swarna N Chowdhuri
(74) *Attorney, Agent, or Firm* — Morgan, Lewis & Bockius LLP

(57) ABSTRACT

A vehicle includes a generator, a battery, a plurality of electrical devices configured to receive power from the generator and the battery, and a power controller. The power controller may group the plurality of electrical devices into a plurality of groups, and control an operation of an electrical device belonging to a group to which at least one electrical device among the plurality of electrical devices belongs, according to a fluctuation of an input voltage of the at least one electrical device.

14 Claims, 14 Drawing Sheets

| VOLTAGE FLUCTUATION RANGE / FLUCTUATING LOAD | FIRST ELECTRICAL DEVICE | SECOND ELECTRICAL DEVICE | THIRD ELECTRICAL DEVICE | FOURTH ELECTRICAL DEVICE |
|---|---|---|---|---|
| FIRST ELECTRICAL DEVICE | HIGH | INTERMEDIATE | LOW | LOW |
| SECOND ELECTRICAL DEVICE | INTERMEDIATE | HIGH | LOW | LOW |
| THIRD ELECTRICAL DEVICE | LOW | LOW | HIGH | INTERMEDIATE |
| FOURTH ELECTRICAL DEVICE | LOW | LOW | INTERMEDIATE | HIGH |

(56) References Cited

FOREIGN PATENT DOCUMENTS

| JP | 2008-087534 A | 4/2008 |
|----|---------------|--------|
| JP | 2014-193090 A | 10/2014 |
| KR | 10-2011-0109518 A | 10/2011 |

* cited by examiner

FIG. 7

| VOLTAGE FLUCTUATION RANGE / FLUCTUATING LOAD | FIRST ELECTRICAL DEVICE | SECOND ELECTRICAL DEVICE | THIRD ELECTRICAL DEVICE | FOURTH ELECTRICAL DEVICE |
|---|---|---|---|---|
| FIRST ELECTRICAL DEVICE | HIGH | INTERMEDIATE | LOW | LOW |
| SECOND ELECTRICAL DEVICE | INTERMEDIATE | HIGH | LOW | LOW |
| THIRD ELECTRICAL DEVICE | LOW | LOW | HIGH | INTERMEDIATE |
| FOURTH ELECTRICAL DEVICE | LOW | LOW | INTERMEDIATE | HIGH |

FIG. 10

| GROUP(210) | FIRST GROUP | | SECOND GROUP | |
|---|---|---|---|---|
| ELECTRICAL DEVICE(220) | FIRST ELECTRICAL DEVICE | SECOND ELECTRICAL DEVICE | THIRD ELECTRICAL DEVICE | FOURTH ELECTRICAL DEVICE |
| REFERENCE FLUCTUATION MAGNITUDE(230) | 2.0V | | 1.0V | |
| OPERATION STATE(240) | ON | LEVEL 3 | LEVEL 2 | OFF |
| INPUT VOLTAGE (250) | 11.5V | 11.5V | 12.0V | 12.1V |
| VOLTAGE FLUCTUATION MAGNITUDE(260) | 2.5V | 2.5V | 1.0V | 0.9V |

VEHICLE AND POWER CONTROLLER

CROSS-REFERENCE TO RELATED APPLICATION

This application claims the benefit of Korean Patent Application No. 10-2017-0122313, filed on Sep. 22, 2017 in the Korean Intellectual Property Office, the disclosure of which is incorporated herein by reference.

TECHNICAL FIELD

Embodiments of the present disclosure relate to a vehicle and a power controller, and more particularly, to a vehicle and a power controller capable of stabilizing a voltage of power to be supplied to electric components.

BACKGROUND

In general, a vehicle is transfer means or transportation means that travels on a road or rails using fossil fuel, electricity, etc. as a power source.

The vehicle includes a starter motor for starting the vehicle, and includes various electric components to protect a driver and to provide the driver with convenience and entertainment. Also, the vehicle includes a generator to generate power to be supplied to the starter motor and the electric components, and a battery to store power generated by the generator.

Recently, many vehicles install high-power electric components consuming a large amount of power, such as an electric power steering apparatus, an air conditioner, a heating wire, etc., and such high-power electric components consume a large amount of power for a short time. If a large amount of power is consumed by the high-power electric components, a voltage of power that is supplied to the electric components may be reduced sharply, and due to a low voltage, some electric components may stop operating.

Particularly, if electric components directly associated with driving of the vehicle, such as an engine controller, a transmission controller, a brake controller, a steering controller, etc., stop operating, risks of accidents may increase sharply.

SUMMARY

Therefore, it is an aspect of the present disclosure to provide a vehicle and a power controller capable of stabilizing a voltage of power to be supplied to electric components.

It is an aspect of the present disclosure to provide a vehicle and a power controller capable of grouping electric components into a plurality of groups according to locations of the electric components, and stabilizing a voltage of power to be supplied to each group.

It is an aspect of the present disclosure to provide a vehicle and a power controller capable of monitoring a voltage of power supplied to each of a plurality of groups, and controlling, when a voltage of a group fluctuates, operations of electric components belonging to the group.

Additional aspects of the disclosure will be set forth in part in the description which follows and, in part, will be obvious from the description, or may be learned by practice of the disclosure.

In accordance with one aspect of the present disclosure, a vehicle includes a generator, a battery, a plurality of electrical devices configured to receive power from the generator and the battery, and a power controller. The power controller may group the plurality of electrical devices into a plurality of groups, and control an operation of an electrical device belonging to a group to which at least one electrical device among the plurality of electrical devices belongs, according to a fluctuation of an input voltage of the at least one electrical device.

The power controller may group the plurality of electrical devices into the plurality of groups based on locations of the plurality of electrical devices.

The power controller may group the plurality of electrical devices into the plurality of groups based on an electrical connection relationship between the plurality of electrical devices.

Each of the plurality of electrical devices may measure an input voltage applied from the generator and the battery, and transmit information about the input voltage to the power controller.

If a fluctuation magnitude of the input voltage of the at least one electrical device is greater than a reference fluctuation magnitude, the power controller may reduce outputs of electrical devices belonging to the group to which the at least one electrical device belongs.

If a fluctuation magnitude of an input voltage of the at least one electrical device is greater than the reference fluctuation magnitude after the power controller reduces the output of the electrical device belonging to the group to which the at least one electrical device belongs, the power controller may stop operations of the plurality of electrical devices.

If fluctuation magnitudes of input voltages of the plurality of electrical devices are greater than the reference fluctuation magnitude, the power controller may stop operations of the plurality of electrical devices.

In accordance with one aspect of the present disclosure, a vehicle includes a first electrical device and a second electrical device belonging to a first group, a third electrical device belonging to a second group, and a power controller. The power controller may collect an input voltage of the first electrical device, and control operations of the first electrical device and the second electrical device belonging to the first group according to a fluctuation of the input voltage of the first electrical device.

The power controller may group the first electronic device and the second electrical device into the first group, and group the third electrical device into the second group, according to locations at which the first electrical device, the second electrical device and the third electrical device are installed.

The power controller may group the first electrical device and the second electrical device into the first group, and group the third electrical device into the second group, according to an electrical connection relationship between the first electrical device, the second electrical device and the third electrical device.

If a fluctuation magnitude of an input voltage of the first electrical device is greater than a reference fluctuation magnitude, the power controller may reduce outputs of the first electrical device and the second electrical device belonging to the first group.

If a fluctuation magnitude of an input voltage of the first electrical device is greater than the reference fluctuation magnitude after the power controller reduces the outputs of the first electrical device and the second electrical device, the power controller may stop operations of the first electrical device, the second electrical device and the third electrical device.

The power controller may collect input voltages of the second electrical device and the third electrical device, and stop operations of the first electrical device, the second electrical device and the third electrical device if fluctuation magnitudes of the input voltages of the second electrical device and the third electrical device are greater than the reference fluctuation magnitude.

Each of the first electrical device, the second electrical device and the third electrical device may measure an input voltage, and transmit the input voltage to the power controller.

In accordance with one aspect of the present disclosure, a power controller includes a communication device configured to communicate with a plurality of electrical devices installed in a vehicle, and a controller. The controller may group the plurality of electrical devices into a plurality of groups, receive an input voltage of at least one electrical device among the plurality of electrical devices through the communication device, and output an operation control signal for controlling an operation of an electrical device belonging to a group to which the at least one electrical device belongs, according to a fluctuation of the input voltage of the at least one electrical device.

The controller may group the plurality of electrical devices into the plurality of groups, based on locations of the plurality of electrical devices.

The controller may group the plurality of electrical devices into the plurality of groups, based on an electrical connection relationship between the plurality of electrical devices.

If a fluctuation magnitude of the input voltage of the at least one electrical device is greater than a reference fluctuation magnitude, the controller may output an operation control signal for reducing an output of the electrical device belonging to the group to which the at least one electrical device belongs.

If a fluctuation magnitude of an input voltage of the at least one electrical device is greater than the reference fluctuation magnitude after the controller outputs the operation control signal for reducing the output of the electrical device belonging to the group to which the at least one electrical device belongs, the controller may output an operation control signal for stopping operations of the plurality of electrical devices.

If a fluctuation magnitude of input voltages of the plurality of electrical devices is greater than a reference fluctuation magnitude, the controller may output an operation control signal for stopping operations of the plurality of electrical devices.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a table showing an example of voltage fluctuations of the electrical devices shown in FIG. 6 to be grouped;

FIG. 10 shows an example of a table in which operation states and input voltages of electrical devices are stored according to the control method shown in FIG. 9;

DETAILED DESCRIPTION

Figure 1:
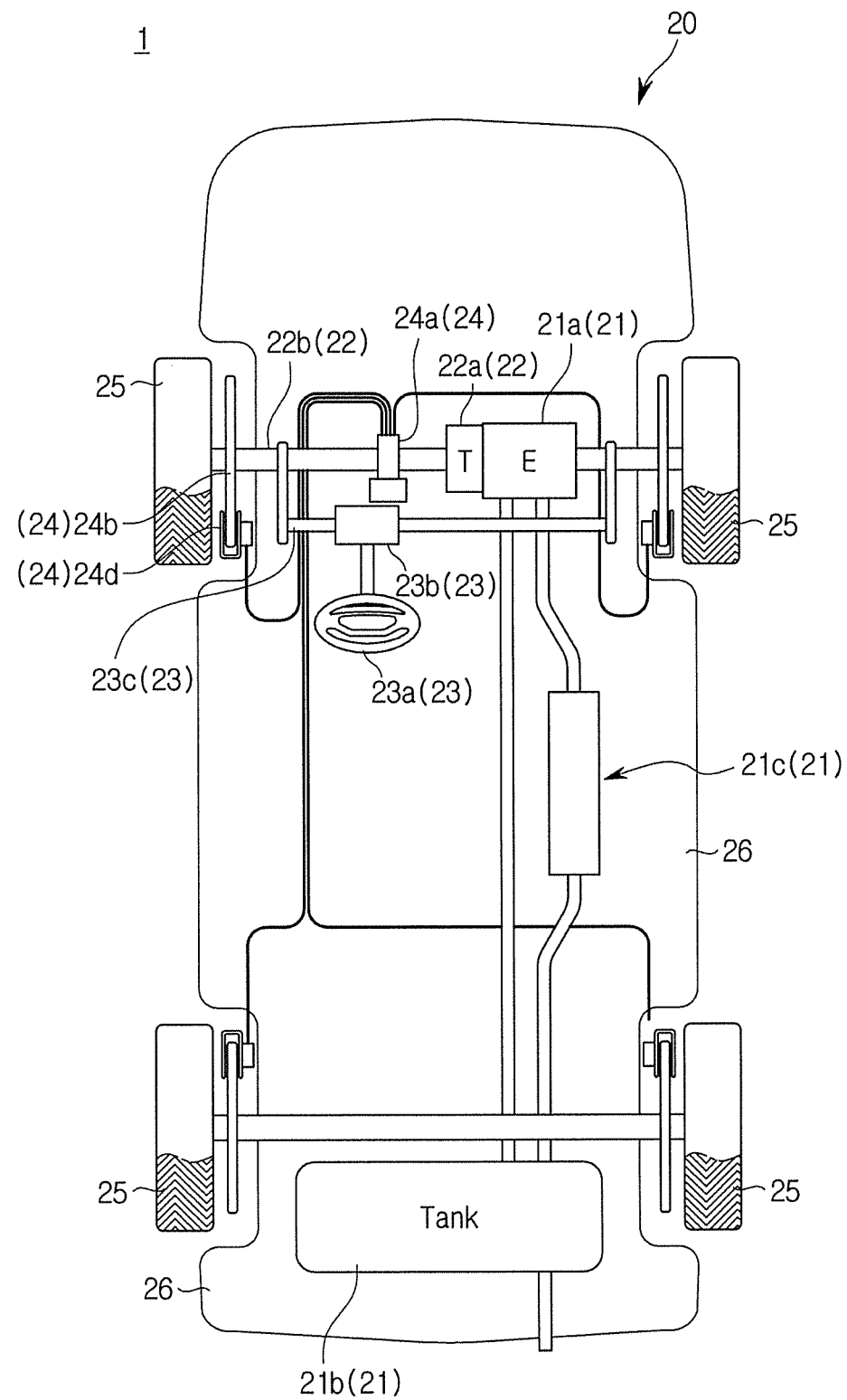
FIG. 1 shows main components of a vehicle according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 2:
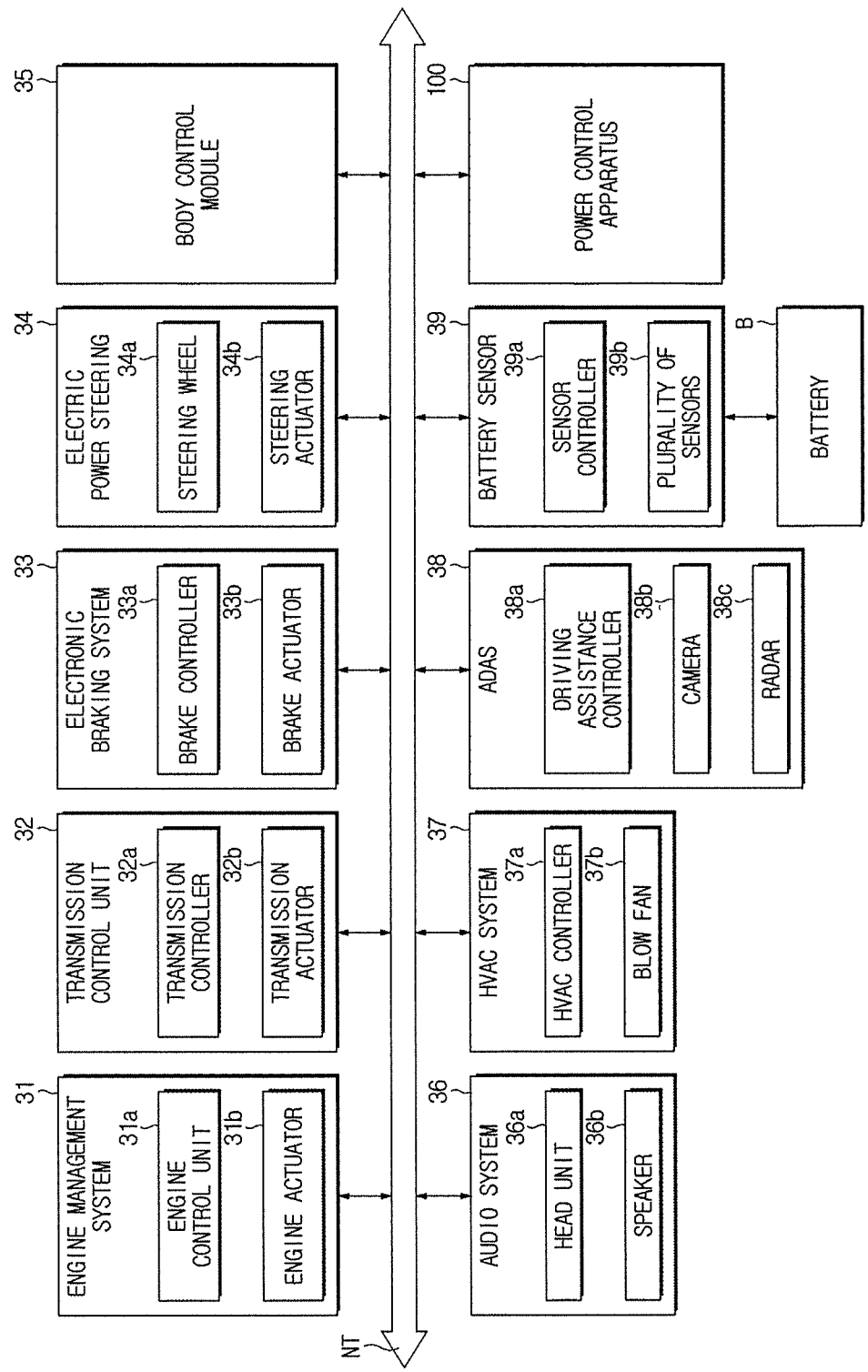
FIG. 2 shows electric components of a vehicle according to an embodiment of the present disclosure.

FIG. 1 shows main components of a vehicle according to an embodiment of the present disclosure. FIG. 2 shows electric components of a vehicle according to an embodiment of the present disclosure.

Referring to FIGS. 1 and 2, a vehicle 1 may include a body (not shown) forming an outer appearance of the vehicle 1 and configured to accommodate a driver and/or baggage, a chassis 20 including components of the vehicle 1 except for the body, and a plurality of electric components 30 configured to protect the driver and to provide the driver with convenience.

The chassis 20 may include apparatuses to generate power for driving the vehicle 1 according to the driver's control, and to drive/brake/steer the vehicle 1 using the power. For example, the chassis 20 may include, as shown in FIG. 1, a power generation system 21, a power transfer system 22, a steering system 23, a brake system 24, wheels 25, and a frame 26.

The power generation system 21 may generate rotational power required for the vehicle 1 to travel, and may include an engine 21a, a fuel supply apparatus 21b, and an exhaust system 21c.

The power transfer system 22 may transfer rotational power generated by the power generation system 21 to the wheels 25, and may include a transmission 22a, a gearshift, a differential gear, and a driving shaft 22b.

The steering system 23 may control the driving direction of the vehicle 1, and may include a steering wheel 23a, a steering gear 23b, and a steering link 23c.

The brake system 24 may stop rotation of the wheels 25, and may include a brake pedal, a master cylinder 24a, a brake disc 24b, and a brake pad 24c.

The wheels 25 may receive rotational power from the power generation system 21 through the power transfer system 22 to move the vehicle 1. The wheels 25 may include front wheels provided in a front portion of the vehicle 1, and rear wheels provided in a rear portion of the vehicle 1.

The frame 26 may fix the power generation system 21, the power transfer system 22, the steering system 23, the brake system 24, and the wheels 25.

The vehicle 1 may include various electric components 30 for controlling the vehicle 1 and for the driver and passengers' convenience and safety, in addition to the above-described mechanical components.

For example, as shown in FIG. 2, the vehicle 1 may include an Engine Management System (EMS) 31, a Transmission Control Unit (TCU) 32, an Electronic Braking System (EBS) 33, an Electric Power Steering (EPS) 34, a Body Control Module (BCM) 35, an audio system 36, a Heating/Ventilation/Air Conditioning (HVAC) system 37, an Advanced Driver Assistance System (ADAS) 38, a battery sensor 39, and a power controller 100. Also, the vehicle 1 may include a battery B to supply power to the electric components 30.

The controller 100 is an electric circuitry that executes instructions of software which thereby performs various functions described hereinafter.

The engine management system 31 may control operations of the engine 21a and manage the engine 21a, in response to the driver's acceleration command received through an accelerator pedal. The engine management system 31 may include an engine actuator 31b including a throttle valve, etc. to adjust mixed gas that is injected into the engine 21a, and an Engine Control Unit (ECU) 31a to control operations of the engine actuator 31b.

The transmission control unit 32 may control operations of the transmission 22a in response to the driver's gear-shifting command received through the gearshift or in response to the driving speed of the vehicle 1. The transmission control unit 32 may include a transmission actuator 32b including a shift solenoid, etc. to shift gears of the transmission 22a, and a transmission controller 32a to control operations of the transmission actuator 32b.

The electronic braking system 33 may control the brake system of the vehicle 1 and maintain the balance of the vehicle 1, in response to the driver's brake command received through the brake pedal. The electronic braking system 33 may include a brake actuator 33b including a pump/motor for generating brake pressure, a valve for controlling the brake pressure, etc., and a brake controller 33a to control operations of the brake actuator 33b.

The electric power steering 34 may assist the driver to easily manipulate the steering wheel 34a. The electric power steering 34 may include a steering actuator 34b including a motor, etc. for generating auxiliary steering power, and a steering control unit 34a to control operations of the steering actuator 34b.

The brake control module 35 may control operations of electric components for providing the driver with convenience or for ensuring the driver's safety. The brake control module 35 may control a door lock system, head lamps, wipers, a power seat, seat heaters, a cluster, a room lamp, a tail gate, etc., installed in the vehicle 1. Also, control units for controlling the door lock system, the head lamps, the wipers, the power seat, the seat heaters, the cluster, the room lamp, and the tail gate independently may be provided separately.

The audio system 36 may provide the driver with various information and entertainment through sound. The audio system 36 may include a head unit 36a to reproduce an audio file stored in internal storage medium or external storage medium according to the driver's command, and a speaker 36b to output sound corresponding to a reproduced audio file.

The HVAC system 37 may control entrance of outside air or heat or cool indoor air according to inside temperature of the vehicle 1. The HVAC system 37 may include a blow fan 37b to blow heated or cooled air to the inside of the vehicle 1, and a HVAC controller 37a to control operations of the blow fan 37b according to inside temperature of the vehicle 1.

The advanced driver assistance system 38 may detect an obstacle in front of and behind the vehicle 1 during traveling to warn the driver of the detection of the obstacle or to control driving of the vehicle 1 according to the detection of the obstacle. The advanced driver assistance system 38 may include a camera 38b or a radar 38c to detect an obstacle in front of and behind the vehicle 1, and a driving assistance controller 38a to control operations of the camera 38b or the radar 38c and to process outputs from the camera 38b or the radar 38c.

The battery B may store electrical energy generated by the rotational power of the engine, and supply power to the various electric components 30 included in the vehicle 1. For example, when the vehicle 1 travels, a generator may convert rotational energy of the engine to electrical energy, and the battery B may receive the electrical energy from the generator to store the electrical energy. Also, the battery B may supply power for starting the engine to a starter motor or supply power to the electric components 30, in order to drive the vehicle 1.

The battery sensor 39 may acquire state information related to the battery B. The battery sensor 39 may include a plurality of sensors 39b to collect information about states of the battery B, such as an output voltage of the battery B, input/output current of the battery B, temperature of the battery B, etc. Also, the battery sensor 39 may include a sensor controller 39a to calculate a State of Charge (SoC) of the battery B, a State of Health (SoH) of the battery B, etc. based on the information about the states of the battery B.

The power controller 100 may group the electric components 30 included in the vehicle 1 into a plurality of groups according to locations of the electric components 30. Also, the power controller 100 may collect states of electric components 30 included in each group, input voltages of the electric components 30, etc. from the electric components 30, and control operations of the electric components 30 belonging to the corresponding group according to the input voltages of the electric components 30. For example, if the input voltages of the electric components 30 often fluctuate or are unstable, the power controller 100 may reduce power consumption of the electric components 30 or block power supply to the electric components 30.

Operations of the power controller 100 will be described in more detail, below.

The electric components 30 may communicate with each other through a vehicle communication network NT. For example, the electric components 30 may transmit or receive data through the Ethernet, Media Oriented Systems Transport (MOST), FlexRay, a Controller Area Network (CAN), a Local Interconnect Network (LIN), and the like.

Hereinafter, a power system and the power controller 100 of the vehicle 1 will be described.

Figure 3:
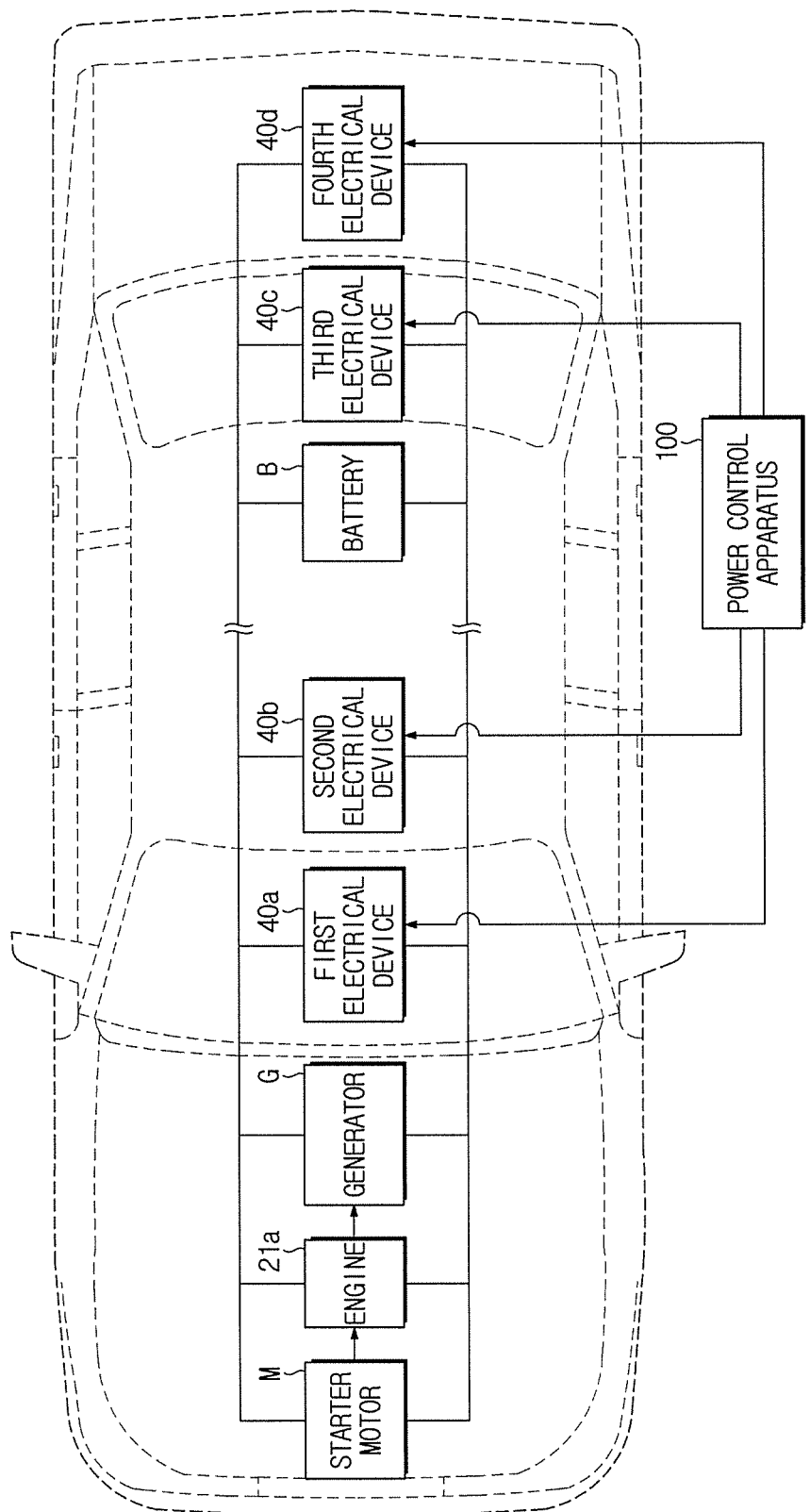
FIG. 3 shows a power system and a power controller of a vehicle according to an embodiment of the present disclosure.
Figure 4:
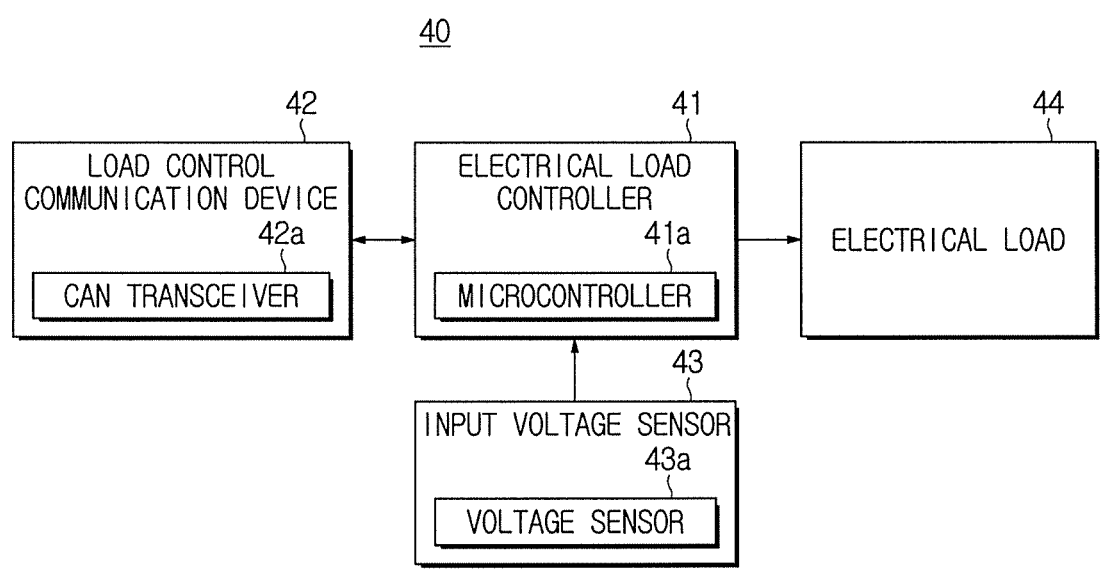
FIG. 4 is a block diagram showing a configuration example of electrical devices included in a vehicle according to an embodiment of the present disclosure.
Figure 5:
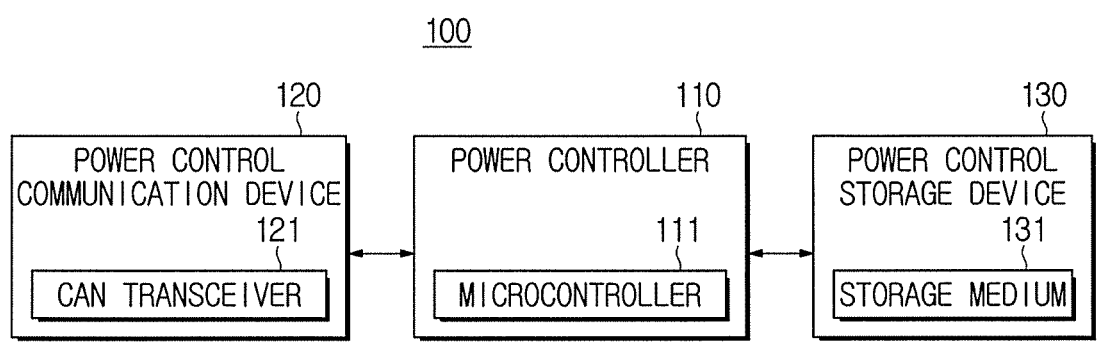
FIG. 5 is a block diagram showing a configuration of a power controller included in a vehicle according to an embodiment of the present disclosure.

FIG. 3 shows a power system and a power controller of a vehicle according to an embodiment of the present disclosure. FIG. 4 is a block diagram showing a configuration example of electrical devices included in a vehicle according to an embodiment of the present disclosure. FIG. 5 is a block diagram showing a configuration of a power controller included in a vehicle according to an embodiment of the present disclosure.

As shown in FIG. 3, the vehicle 1 may include a starter motor M, the engine 21a, a generator G, the battery B, a plurality of electrical devices (40: 40a, 40b, 40c, and 40d), and the power controller 100.

The starter motor M, the engine 21a, the generator G, the battery B, and the plurality of electrical devices 40 may be connected to each other through power lines, and the power controller 100 may transmit control signals to the electrical devices 40.

The starter motor M may provide rotational power to the engine 21a in order to start the engine 21a when the engine 21a stops. The starter motor M may receive power from the battery B. Since the starter motor M consumes a large amount of power to start the engine 21a, the battery B may need to maintain a predetermined battery level (for example, a battery level of about 80%) or greater in order to operate the starter motor M.

The generator G may generate electrical energy, that is, power. The engine 21a may generate rotational power by explosively burning fuel, and the rotational power of the engine 21a may be transferred to the wheels 25 via the transmission 22a. At this time, a part of the rotational power generated by the engine 21a may be provided to the generator G, and the generator G may generate power from the rotational force of the engine 21a.

The generator G may include a rotor including a field coil and a stator including an armature coil. The rotor may rotate by rotations of the engine 21a, and the stator may be fixed. If current is supplied to the field coil when the rotor rotates by the engine 21a, a rotating magnetic field may be generated, and induced current may be induced in the armature coil due to the rotating magnetic field. In this way, the generator G may generate power using the rotational power of the engine 21a.

Further, a magnitude of the magnetic field generated by the rotor may change according to a magnitude of current that is supplied to the field coil, and a magnitude of the induced current generated in the armature coil may also change according to the magnitude of the current. In other words, a generation amount of power of the generator G may be adjusted according to a magnitude of current that is supplied to the field coil.

A part of power generated by the generator G may be supplied to the electrical devices 40 of the vehicle 1, and the other part of the power may be stored in the battery B of the vehicle 1. In other words, a part of power generated by the generator G may be supplied to the electrical devices 40, and the remaining power may be stored in the battery B.

The generator G may be disposed around the engine 21a. For example, if the engine 21a is located in the front portion of the vehicle 1, the generator G may also be located in the front portion of the vehicle 1, that is, in a front area.

The battery B may supply power for starting the engine 21a to the starter motor M when the engine 21a stops, and supply power to the electrical devices 40 of the vehicle 1. For example, if power consumed by the electrical devices 40 is greater than power generated by the generator G when the vehicle 1 travels, the battery B may supply power to the electrical devices 40, and also, when the vehicle 1 is parked, the battery B may supply power to the electrical devices 40 since the engine 21a stops.

The battery B may store power supplied from the generator G in the form of chemical energy, and adopt a Pb-Acid battery or a Li-ion battery.

The battery B may be located in the rear portion of the vehicle 1, that is, in a rear area.

The electrical devices 40 may receive power from the generator G and/or the battery B to protect the driver or to provide the driver with convenience. The electrical devices 40 may further include the electric components 30 shown in FIG. 2, for example, the engine management system 31, the transmission control unit 32, the electronic braking system 33, the electric power steering 34, the body control module 35, the audio system 36, the HVAC system 37, the advanced driver assistance system 38, and the battery sensor 39. However, the electrical devices 40 may further include various electric components not shown in FIG. 2.

For example, the electrical devices 40 may include a first electrical device 40a, a second electrical device 40b, a third electrical device 40c, and a fourth electrical device 40d.

Each electrical device 40 may include, as shown in FIG. 4, a load control communication device 42 to communicate with the other electrical devices 40, an input voltage sensor 43 to measure a voltage of power supplied to the corresponding electrical device, an electrical load 44 to provide the driver with a service or to drive the vehicle 1, and an electrical load controller 41 to control operations of the electrical load 44.

The load control communication device 42 may include a CAN transceiver 42a to receive communication signals from the other electrical devices 40 or transmit communication signals to the other electrical devices 40 through the vehicle communication network NT, and a communication controller to control operations of the CAN transceiver 42a.

The CAN transceiver 42a may receive communication data from the electrical devices 40 through the vehicle communication network NT, and output the communication data to the electrical load controller 41. Also, the CAN transceiver 42a may receive communication data from the electrical load controller 41, and transmit the communication data to the electrical devices 40 through the vehicle communication network NT. For example, the CAN transceiver 42a may transmit a voltage value of power supplied from the generator G and/or the battery B and an operation state of the electrical load 44 to the power controller 100, and receive a command for an operation of the electrical load 44 from the power controller 100.

The input voltage sensor 43 may include a voltage sensor 43a to measure a voltage value of power supplied to the corresponding electrical device, and a sensing controller to control operations of the voltage sensor 43a.

The voltage sensor 43a may measure a voltage value applied to the corresponding electrical device at predetermined sampling time intervals, and output an electrical signal corresponding to the measured voltage value to the electrical load controller 41.

The electrical load 44 may include an actuator to perform mechanical operations and/or electrical operations in order to provide the driver with a service or to drive the vehicle 1. For example, the electrical load 44 may be a motor, a valve, a heating wire, a display panel, a speaker, etc. The actuator may generate rotational motion power, generate translational motion power, output light, or output sound, according to the control of the electrical load controller 41.

Further, the actuator may be the engine actuator 31b, the transmission actuator 32b, the brake actuator 33b, the steering actuator 34b, the speaker 36b, the blow fan 37b, the camera 38b, or the radar 38c, as described above. Also, the actuator may be the door lock system, the head lamps, the wipers, the power seat, the seat heaters, the cluster, the room lamp, the tail gate, etc., which are controlled by the body control module 35.

The electrical load 44 may be classified into a high-power load and a low-power load according to an amount of power that is consumed during operation. For example, the electrical load 44 including an actuator, such as a motor and a heating wire, which consumes a large amount of power may be classified into a high-power load, and the electrical load 44 including an actuator, such as a valve, a speaker, and a display, which consumes a relatively small amount of power may be classified into a lower-power load.

The electrical load controller 41 may control operations of the load control communication device 42, the input voltage sensor 43, and the electrical load 44. For example, the electrical load controller 41 may be the engine control unit 31a, the transmission controller 32a, the brake controller 33a, the steering control unit 34a, the body control module 35, the HVAC control unit 37a, or the driving assistance control unit 38a.

The electrical load controller 41 may include a microcontroller 41a to process communication data of the load control communication device 42 and an input voltage value of the input voltage sensor 43, and to generate control signals for controlling the load control communication device 42 and the electrical load 44.

The microcontroller 41a may include a processor to perform logical operations, arithmetic operations, etc., and a memory to store programs and data.

The microcontroller 41a may generate a control signal for controlling the electrical load 44 according to the programs stored in the memory and the results of operation processing by the processor. For example, the microcontroller 41a may receive an input voltage value from the input voltage sensor 43, and generate a communication control signal for transmitting the input voltage value to the power controller 100 through the load control communication device 42. Also, the microcontroller 41a may receive communication data from the load control communication device 42, and generate a load control signal for controlling the electrical load 44 according to a load control command included in the communication data.

In this way, the electrical load controller 41 may control the electrical load 44 according to the driver's command and a pre-stored program, control the load control communication device 42 to transmit an input voltage value from the input voltage sensor 43 to the power controller 100, and control the electrical load 44 according to a load control command from the power controller 100.

The electrical devices 40 may be disposed at various locations in the vehicle 1.

As shown in FIG. 3, the first electrical device 40a and the second electrical device 40b may be disposed in the front portion of the vehicle 1. For example, the engine management system 31, the transmission control unit 32, the electronic braking system 33, the electric power steering 34, the audio system 36, the HVAC system 37, the driving assistance system 38, the front seat heating wire, the head lamps, or the wipers may be disposed in the front portion of the vehicle 1.

Further, the third electrical device 40c and the fourth electrical device 40d may be disposed in the rear portion of the vehicle 1. For example, the rear seat heating wire and the tail gate may be disposed in the rear portion of the vehicle 1.

The power controller 100 may stabilize a voltage value of power that is supplied from the generator G and/or the battery B to the electrical devices 40.

The power controller 100 may group the electrical devices 40 into a plurality of groups according to their locations, and control operations of all electrical devices 40 belonging to each group according to an input voltage value of the electrical devices 40 belonging to the group.

The power controller 100 may include, as shown in FIG. 5, a power control communication device 120 to communicate with the electrical devices 40, a power control storage device 130 to store data about operation states, voltage states, etc. of the electrical devices 40, and a power controller 110 to control operations of the electrical devices 40 according to the operation states and voltage states of the electrical devices 40.

The power control communication device 120 may include a CAN transceiver 121 to receive communication signals from the electrical devices 40 through the vehicle communication network NT, and to transmit the communication signals to the electrical devices 40, and a communication controller to control operations of the CAN transceiver 121.

The CAN transceiver 121 may receive communication data from the electrical devices 40 through the vehicle communication network NT, and output the communication data to the electrical load controller 41. Also, the CAN transceiver 121 may receive communication data from the electrical load controller 41, and transmit the communication data to the electrical devices 40 through the vehicle communication network NT. For example, the CAN transceiver 121 may receive input voltage values of power that is supplied to the electrical devices 40, and an operation state of the electrical load 44, from the electrical devices 40, and transmit a command for an operation of the electrical load 44 to the electrical devices 40.

The power control storage device 130 may include storage medium 131 to store voltage values of power that is supplied to the electrical devices 40 and an operation state of the electrical load 44, and a storage controller to control storing/deleting/loading of data stored in the storage medium 131.

The storage medium 131 may store a data table including groups to which the electrical devices 40 belong, current operation states of the electrical devices 40, input voltage values of the electrical devices 40 measured at predetermined sampling time intervals, and fluctuation magnitudes of the input voltages for a predetermined time period. Also, the storage medium 131 may update data included in the data table according to a update control signal from the power controller 110, or output data included in the data table according to a read control signal.

The storage medium 131 may include flash memory, a Solid State Drive (SSD), a Hard Disc Drive (HDD), or the like.

The power controller 110 may control operations of the power control communication device 120 and the power control storage device 130, and control operations of the electrical devices 40.

The power controller 110 may include a microcontroller 111 to process communication data of the power control communication device 120 and stored data of the power control storage device 130, and to generate communication messages for controlling the electrical devices 40.

The microcontroller 111 may include a processor to perform logical operations, arithmetic operations, etc., and memory to store programs and data.

The microcontroller 111 may generate communication messages for controlling the electrical devices 40 according to the programs stored in the memory and the results of operation processing by the processor. For example, the microcontroller 111 may receive input voltage values of the electrical devices 40 from the power control communication device 120, and generate a storage control signal for storing the input voltage values of the electrical devices 40 in the power control storage device 130.

Further, the microcontroller 111 may calculate fluctuation magnitudes of input voltages of the electrical devices 40 from the input voltage values of the electrical devices 40 stored in the power control storage device 130, and generate a communication message for controlling the operation of all the electrical devices 40 belonging to the corresponding group according to the fluctuation magnitude of the input voltages of the electrical devices 40.

In this way, the power controller 110 may control the power control storage device 130 to store input voltage values of the electrical devices 40, and control the power control communication device 120 to transmit a communication message for controlling the operation of the electrical devices 40 according to fluctuation magnitudes of the input voltages of the electrical devices 40 to the electrical devices 40.

As described above, the power controller 110 may group the electrical devices 40 into a plurality of groups, and control all the electrical devices 40 belonging to the individual groups according to input voltage values of the electrical devices 40, in order to stabilize a voltage value of power that is supplied from the generator G and/or the battery B to the electrical devices 40.

Hereinafter, operations of the vehicle 1 and the power controller 100 for stabilizing a voltage value of power that is supplied from the generator G and/or the battery B to the electrical devices 40 will be described.

Figure 6:
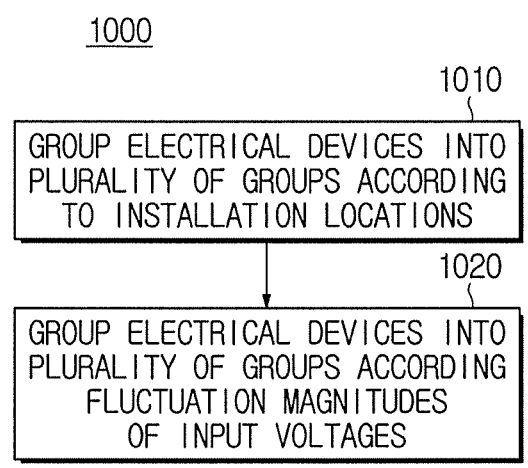
FIG. 6 is a flowchart of a method of grouping electrical devices to control power of a vehicle according to an embodiment of the present disclosure.
Figure 8:
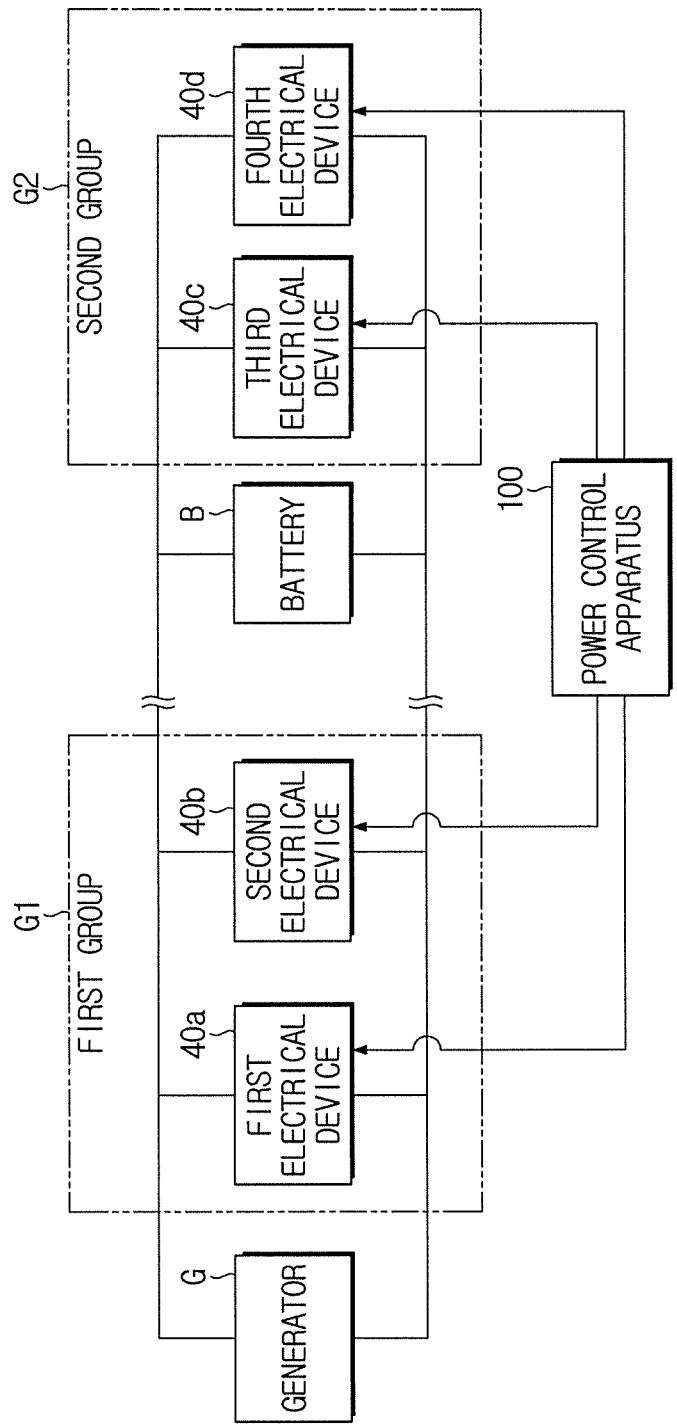
FIG. 8 shows an example of groups of the electrical devices grouped according to the grouping method shown in FIG. 6.

FIG. 6 is a flowchart of a method of grouping electrical devices to control power of a vehicle according to an embodiment of the present disclosure. FIG. 7 is a table showing an example of voltage fluctuations of the electrical devices shown in FIG. 6 to be grouped. FIG. 8 shows an example of groups of the electrical devices grouped according to the grouping method shown in FIG. 6.

Hereinafter, a method 1000 of grouping the electrical devices 40 to control power of the vehicle 1 will be described with reference to FIGS. 6, 7, and 8.

The vehicle 1 may group the electrical devices 40 into a plurality of groups according to locations of the electrical devices 40, in operation 1010.

The power controller 100 of the vehicle 1 may divide the inside of the vehicle 1 into a plurality of areas, and group electrical devices 40 installed in each area into a group.

For example, the power controller 100 may divide the vehicle 1 into a front area and a rear area. Referring to FIG. 3, the first electrical device 40a and the second electrical device 40b may be located in the front area of the vehicle 1, and the third electrical device 40c and the fourth electrical device 40d may be located in the rear area of the vehicle 1.

Accordingly, the power controller 100 may group, as shown in FIG. 8, the first electrical device 40a and the second electrical device 40b located in the front area into a first group G1, and group the third electrical device 40c and the fourth electrical device 40d located in the rear area into a second group G2.

Thereafter, the vehicle 1 may again group the electrical devices 40 into a plurality of groups according to fluctuation magnitudes of input voltages of the electrical devices 40, in operation 1020.

The power controller 100 may again group the electrical devices 40 into a plurality of groups based on an electrical connection relationship of the electrical devices 40.

The power controller 100 may receive input voltage values from the electrical devices 40, and group the electrical devices 40 according to fluctuation magnitudes of the input voltages of the electrical devices 40.

If an electrical device of the electrical devices 40 consumes a large amount of power, an input voltage of the corresponding electrical device may be reduced, and also, an input voltage of another electrical device electrically connected to the corresponding electrical device may be reduced accordingly. Also, a reduced magnitude of the input voltage of the other electrical device may be reduced as the other electrical device is distant from the electrical device it connects and close to the power source (for example, the generator G or the battery B).

For example, as shown in FIG. 7, if the first electrical device 40a consumes a large amount of power, an input voltage of the first electrical device 40a may fluctuate. The fluctuation in input voltage of the first electrical device 40a may also influence input voltages of the second electrical device 40b, the third electrical device 40c, and the fourth electrical device 40d.

As shown in FIG. 7, a fluctuation magnitude of an input voltage of the second electrical device 40b caused by the fluctuation of the input voltage of the first electrical device 40a may be greater than fluctuation magnitudes of input voltages of the third and fourth electrical devices 40c and 40d caused by the fluctuation of the input voltage of the first electrical device 40a. Also, a fluctuation magnitude of an input voltage of the first electrical device 40a caused by a fluctuation of an input voltage of the second electrical device 40b may be greater than fluctuation magnitudes of input voltages of the third and fourth electrical devices 40c and 40d caused by the fluctuation of the input voltage of the second electrical device 40b.

A fluctuation magnitude of an input voltage of the fourth electrical device 40d caused by a fluctuation of an input voltage of the third electrical device 40c may be greater than fluctuation magnitudes of input voltages of the first and second electrical devices 40a and 40b caused by the fluctuation of the input voltage of the third electrical device 40c. Also, a fluctuation magnitude of an input voltage of the third electrical device 40c caused by a fluctuation of an input voltage of the fourth electrical device 40d may be greater than fluctuation magnitudes of input voltages of the first and second electrical devices 40a and 40b caused by the fluctuation of the input voltage of the fourth electrical device 40d.

The power controller 100 may group, as shown in FIG. 8, the first electrical device 40a and the second electrical device 40b electrically associated with each other into a first group G1, and group the third electrical device 40c and the fourth electrical device 40d electrically associated with each other into a second group G2.

As described above, the power controller 100 may group the electrical devices 40 of the vehicle 1 into a plurality of groups according to locations and/or electrical connections of the electrical devices 40.

Figure 9:
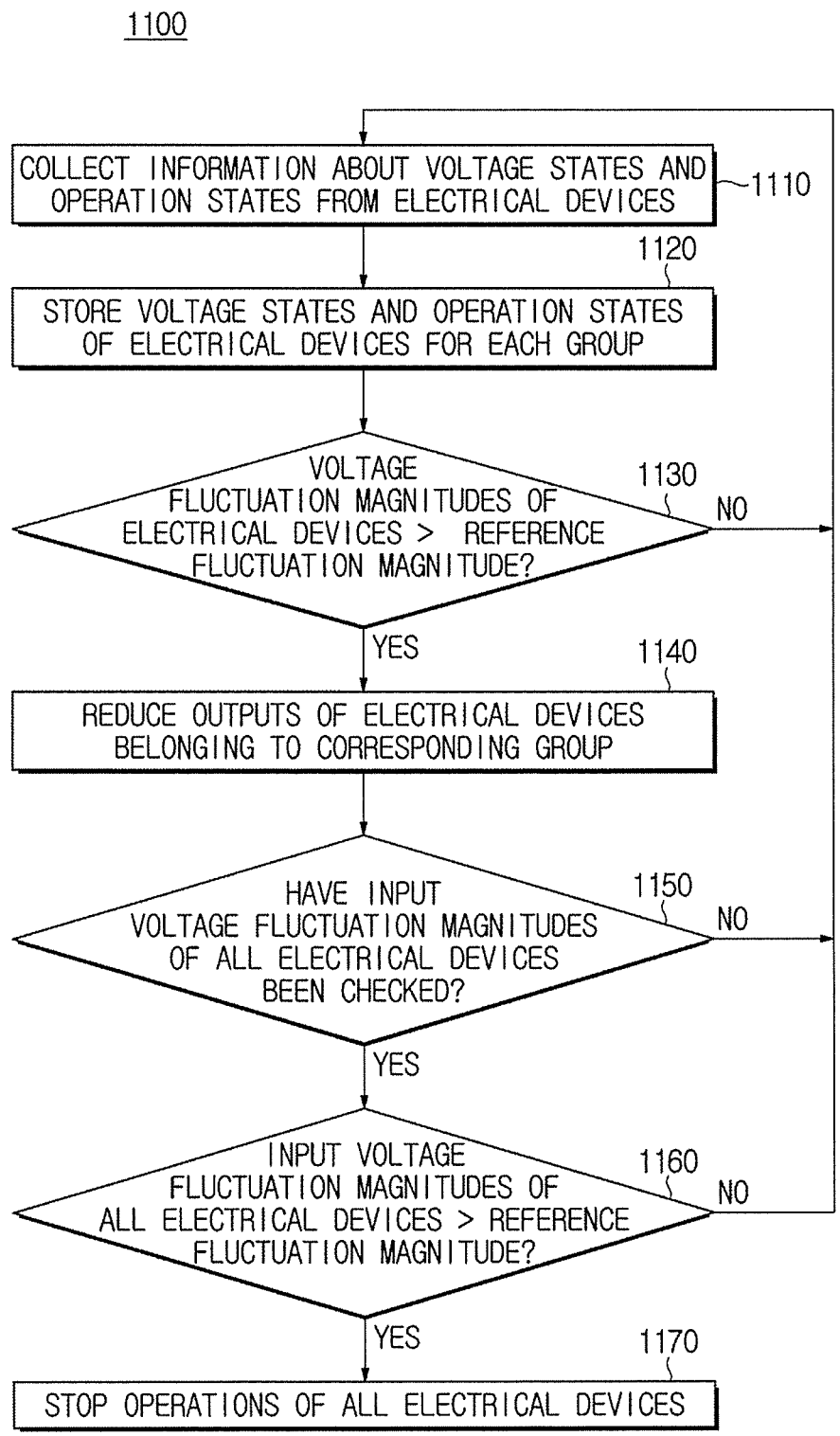
FIG. 9 is a flowchart of a method of controlling electrical devices to control power of a vehicle according to an embodiment of the present disclosure.
Figure 11:
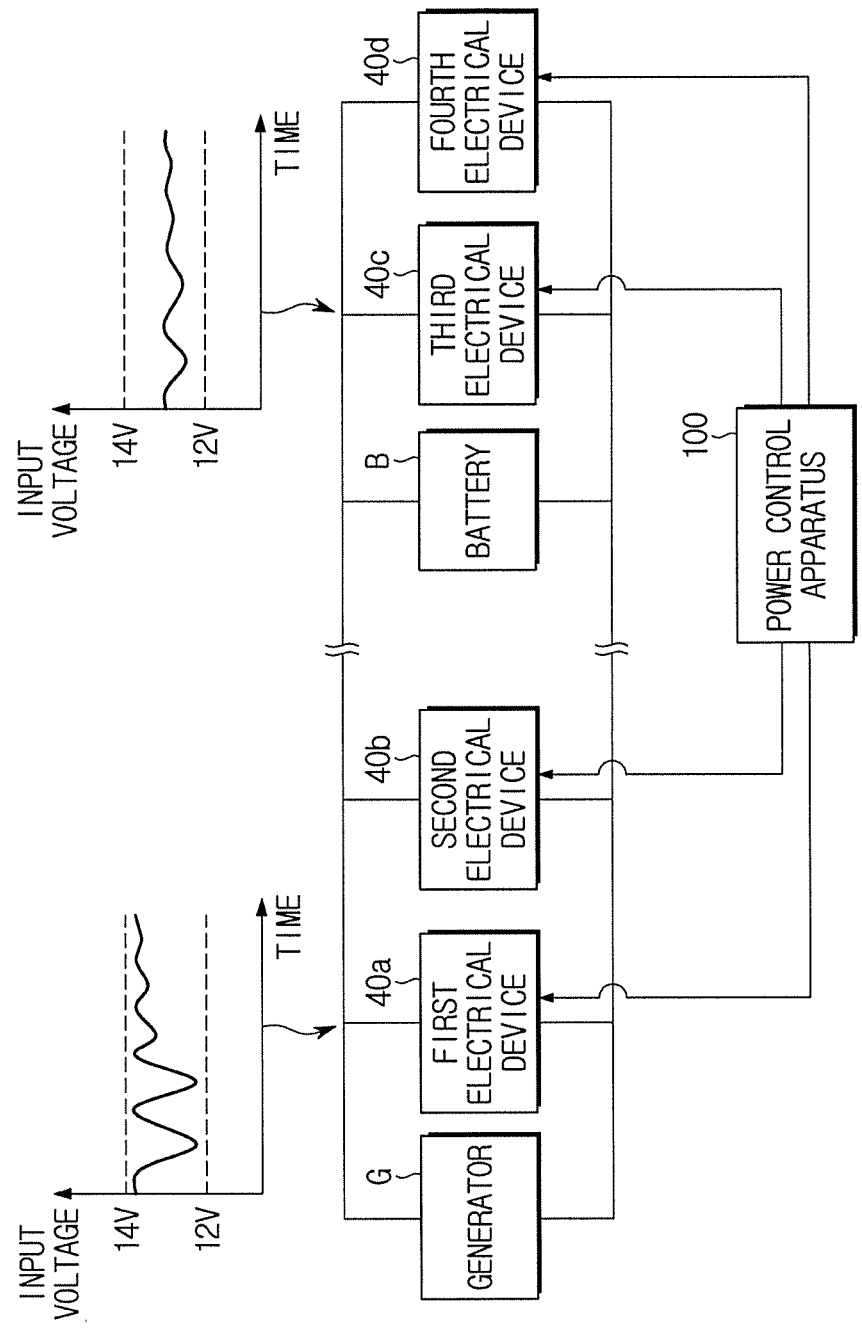
FIGS. 11 and 12 are views for describing an example of controlling electrical devices according to the control method shown in FIG. 9.
Figure 12:
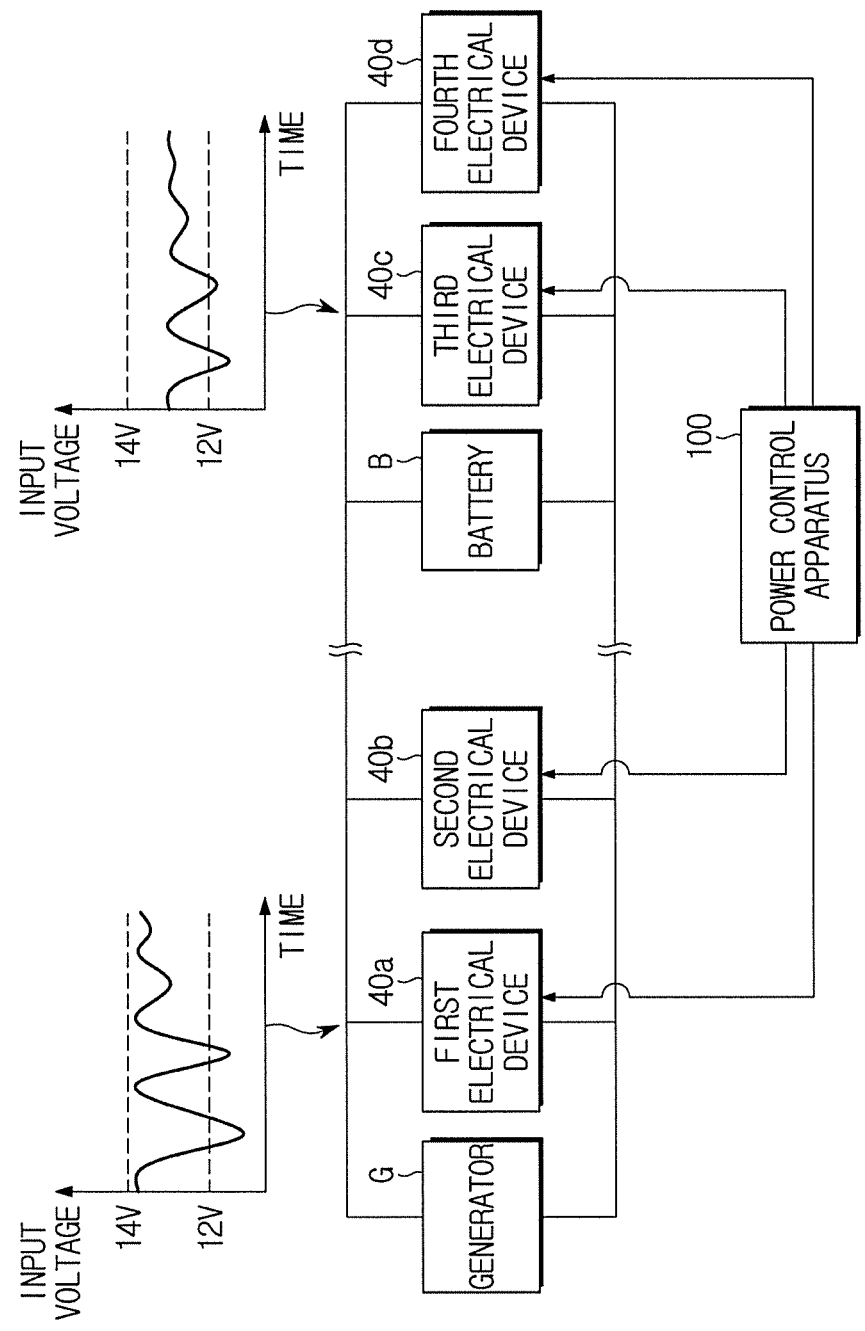

FIG. 9 is a flowchart of a method of controlling electrical devices to control power of a vehicle according to an embodiment of the present disclosure. FIG. 10 shows an example of a table in which operation states and input voltages of electrical devices are stored according to the control method shown in FIG. 9. FIGS. 11 and 12 are views for describing an example of controlling electrical devices according to the control method shown in FIG. 9.

Hereinafter, a method 1100 of controlling the electrical devices 40 to control power of the vehicle 1 will be described with reference to FIGS. 9, 10, 11, and 12.

The vehicle 1 may collect information about voltage states and operation states of the electrical devices 40, in operation 1110.

The power controller 100 of the vehicle 1 may receive information about input voltage values and operation states from the electrical devices 40 through a vehicle communication network NT.

Each electrical device 40 may measure a voltage value of power that is supplied from the generator G or the battery B through the input voltage sensor 43. Also, each electrical device 40 may transmit the measured voltage value to the power controller 100 through the vehicle communication network NT.

Each electrical device 40 may determine an operation state of the electrical load 44. For example, each electrical device 40 may determine whether or not the electrical load 44 operates, and if the electrical load 44 operates, the electrical device 40 may determine an operation level of the electrical load 44. Also, each electrical device 40 may transmit the result of the determination on whether or not the electrical load 44 operates and an operation state including the operation level of the electrical load 44 to the power controller 100 through the vehicle communication network NT.

The vehicle 1 may store the voltage states and the operation states of the electrical devices 40 for each group, in operation 1120.

The power controller 100 may store the voltage states and the operation states of the electrical devices 40 for each group in a data table of the power control storage device 130.

For example, the power controller 100 may store information shown in FIG. 10 in the power control storage device 130.

The information stored in the power control storage device 130 may include identifier information 210 of groups, identifier information 220 of electrical devices, reference fluctuation magnitudes 230 of the groups, operation states 240 of the electrical devices, input voltages 250 of the electrical devices, and voltage fluctuation magnitudes 260 of the electrical devices.

The identifier information 210 of the groups may represent groups divided by the grouping method 1000 described above. For example, the groups may include the first group G1 and the second group G2.

The identifier information 220 of the electrical devices 40 may represent the electrical devices 40 included in the vehicle 1. For example, the electrical devices 40 may include the first electrical device 40a and the second electrical device 40b belonging to the first group G1, and the third electrical device 40c and the fourth electrical devices 40d belonging to the second group G2.

The reference fluctuation magnitude 230 may represent a fluctuation magnitude of an input voltage allowed for electrical devices belonging to each group. The reference fluctuation magnitude 230 may be decided according to the kinds of the electrical devices belonging to each group.

The operation states 240 may include information about whether or not the electrical devices 40 operate and/or about operation levels of the electrical devices 40, received from the individual electrical devices 40. The operation states 240 may be represented as "on"/"off" or "operation level".

The input voltages 250 may represent input voltage values of the electrical devices 40, received from the individual electrical devices 40. In other words, the input voltages 250 may represent voltage values of power that is currently supplied to the electrical devices 40.

The voltage fluctuation magnitudes 260 may represent fluctuation magnitudes of input voltage values of the electrical devices 40 for a predetermined time period. The voltage fluctuation magnitudes 260 may be calculated from the input voltages 250. For example, the power controller 100 may determine a maximum value and a minimum value of input voltage values of the electrical devices 40 for a predetermined time period, and calculate a fluctuation magnitude of the input voltage values from a difference between the maximum value and the minimum value.

The voltage fluctuation magnitudes 260 may represent stabilization levels of voltages of power that is supplied to the electrical devices 40.

The vehicle 1 may determine whether voltage fluctuation magnitudes of the electrical devices 40 are greater than a reference fluctuation magnitude, in operation 1130.

The power controller 100 may compare the input voltage fluctuation magnitudes 260 of the data table stored in the power controller 100 to the reference fluctuation magnitudes 230 of the groups, and determine whether the voltage fluctuation magnitudes of the electrical devices 40 are greater to the reference fluctuation magnitudes, based on the results of the comparison.

If the voltage fluctuation magnitudes of the electrical devices 40 are not greater than the corresponding reference fluctuation magnitude ("NO" in operation 1130), the vehicle 1 may repeat operation of collecting and storing voltage states and operation states of the electrical devices 40.

For example, an input voltage received from the first electrical device 40a may fluctuate between 12V and 14V, as shown in FIG. 11. The fluctuation magnitude of the input voltage of the first electrical device 40a may be smaller than a reference fluctuation magnitude 2V of the first group G1. Accordingly, the power controller 100 may receive voltage states and operation states from other electrical devices.

Further, an input voltage received from the third electrical device 40c may fluctuate between 12V and 13V. The fluctuation magnitude of the input voltage of the third electrical device 40c may be smaller than a reference fluctuation magnitude 1V of the second group G2. Accordingly, the power controller 100 may receive voltage states and operation states from other electrical devices.

If the voltage fluctuation magnitudes of the electrical devices 40 are greater than the corresponding reference fluctuation magnitude ("YES" in operation 1130), the vehicle 1 may reduce outputs of the electrical devices 40 belonging to the corresponding group, in operation 1140.

The power controller 100 may detect an electrical device having a voltage fluctuation magnitude that is greater than a reference fluctuation magnitude, and reduce outputs of all electrical devices belonging to a group to which the detected electrical device belongs.

For example, an input voltage received from the first electrical device 40a may deviate from the range of 12V to 14V as shown in FIG. 12. In this case, the fluctuation magnitude of the input voltage of the first electrical device 40a may be greater than the reference fluctuation magnitude 2V of the first group G1.

Accordingly, the power controller 100 may reduce outputs of the first electrical device 40a and the second electrical device 40b belonging to the first group G1.

More specifically, the power controller 100 may transmit a message corresponding to an output reduction command to the first electrical device 40a and the second electrical device 40b through the vehicle communication network NT. The first electrical device 40a and the second electrical device 40b may reduce outputs of their electrical loads 44 in response to the message from the power controller 100. For example, the second electrical device 40b operating in a level 3 may reduce the operation level of the electrical load 44 to a level 2.

Further, after the power controller 100 reduces the outputs of the first electrical device 40a and the second electrical device 40b, the power controller 100 may again calculate an input voltage fluctuation magnitude of the first electrical device 40a whose output has been reduced. If an input voltage fluctuation magnitude of the first electrical device 40a is still greater than the reference fluctuation magnitude even after the output of the first electrical device 40 is reduced, the power controller 100 may stop the operation of all the first electrical device 40a for stability of power supply.

Thereafter, the vehicle 1 may determine whether input voltage fluctuation magnitudes of all the electrical devices 40 have been checked, in operation 1150.

The power controller 100 may check input voltage fluctuation magnitudes of all the electrical devices 40 in a predetermined order or in an arbitrary order, and determine whether input voltage fluctuation magnitudes of all the electrical devices 40 have been checked.

If the power controller 100 determines that input voltage fluctuation magnitudes of all the electrical devices 40 have been not checked ("NO" in operation 1150), the vehicle 1 may repeat operation of collecting and storing voltage states and operation states of the electrical devices 40.

If the vehicle 1 determines that input voltage fluctuation magnitudes of all the electrical devices 40 have been checked ("YES" in operation 1150), the vehicle 1 may determine whether the input voltage fluctuation magnitudes of all the electrical devices 40 are greater than the reference fluctuation magnitude, in operation 1160.

The power controller 100 may determine whether all the input voltage fluctuation magnitudes of the electrical devices 40 stored in the power control storage device 130 are greater than the reference fluctuation magnitudes 230 of the individual groups.

If the power controller 100 determines that an input voltage fluctuation magnitude of at least one electrical device is not greater than the reference fluctuation magnitude ("NO" in operation 1160), the vehicle 1 may repeat operation of collecting and storing voltage states and operation states of the electrical devices 40.

If the power controller 100 determines that the input voltage fluctuation magnitudes of all the electrical devices 40 are greater than the reference fluctuation magnitude ("YES" in operation 1160), the vehicle 1 may stop the operations of all the electrical devices 40, in operation 1170.

If the power controller 100 determines that the input voltage fluctuation magnitudes of all the electrical devices 40 are greater than the reference fluctuation magnitude, the power controller 100 may determine that there is any problem in supplying power to the electrical devices 40. Accordingly, the power controller 100 may stop the operations of the electrical devices 40 in order to prevent wrong operations of the electrical devices 40.

For example, as shown in FIG. 12, there may be a case in which an input voltage received from the first electrical device 40a deviates from the range of 12V to 14V, and an input voltage received from the third electrical device 40c deviates from the range of 12V to 13V. Also, input voltage fluctuation magnitudes of the second electrical device 40b and the fourth electrical device 40d may deviate from the reference fluctuation magnitude.

In this case, the power controller 100 may stop the operations of the electrical devices 40 belonging to the first group G1 and the second group G2. In other words, the power controller 100 may stop the operations of all the electrical devices 40.

More specifically, the power controller 100 may transmit a message corresponding to an operation stop command to the first, second, third, and fourth electrical devices 40a, 40b, 40c, and 40d through the vehicle communication network NT. The first, second, third, and fourth electrical devices 40a, 40b, 40c, and 40d may stop operations in response to the message from the power controller 100, and warn a driver of an operation stop.

As described above, the vehicle 1 may monitor a voltage value of power that is supplied to the electrical devices 40. If a voltage fluctuation magnitude of power that is supplied to any one electrical device is greater than a predetermined reference fluctuation magnitude, the vehicle 1 may reduce outputs of all electrical devices of a group to which the corresponding electrical device belongs.

As a result, it is possible to stabilize a voltage of power supplied to other electrical devices that are locally or electrically adjacent to an electrical device consuming a larger amount of power. In other words, it is possible to remove local instability of voltages.

Also, if voltage fluctuation magnitudes of power that is supplied to all the electrical devices are greater than the predetermined reference fluctuation magnitude, the vehicle 1 may stop the operations of all the electrical devices 40.

As a result, the vehicle 1 can monitor instability of a power system installed in the vehicle 1, and if instability of the power system is detected, the vehicle 1 can protect the electrical devices 40 from instability of power supply.

The power system of the vehicle 1 is not limited to the power system shown in FIG. 3, and the vehicle 1 may adopt various power systems. Also, in various power systems, the power controller 100 can stabilize a voltage of power that is supplied to the electrical devices 40.

Figure 13:
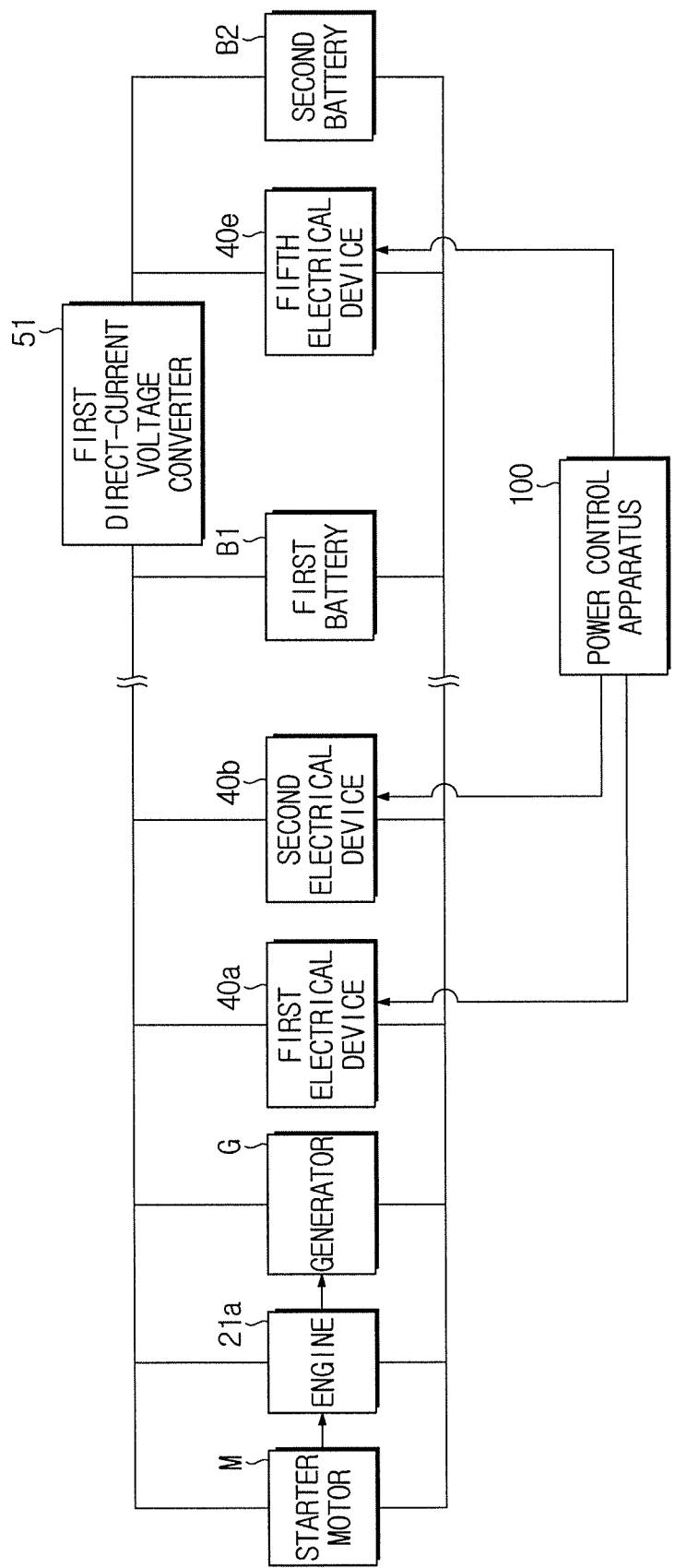
FIG. 13 is a block diagram showing a power system and a power controller of a vehicle according to another embodiment of the present disclosure.

FIG. 13 is a block diagram showing a power system and a power controller of a vehicle according to another embodiment of the present disclosure. The same ones as components shown in FIG. 3 among components shown in FIG. 13 will be assigned the same reference numerals as those assigned to the corresponding components in FIG. 3.

As shown in FIG. 13, the vehicle 1 may include a starter motor M, an engine 21a, a generator G, a first battery B1, a second battery B2, a plurality of electrical devices 40 (that is, a first electrical device 40a, a second electrical device 40b, a fifth electrical device 40e), a first direct-current voltage converter 51, and a power controller 100. Compared to FIG. 3, the second battery B2, the fifth electrical device 40e, and the first direct-current converter 51 may be further provided.

The starter motor M, the engine 21a, and the generator G may be the same as those shown in FIG. 3.

The first battery B1 and the second battery B2 may store electrical energy, and supply power to the electrical devices 40 of the vehicle 1.

The first battery B1 may output power of a first voltage, and the second battery B2 may output power of a second voltage that is different from the first voltage. For example, the first battery B1 may output power of 12V, and the second battery B2 may output power of 48V.

The first battery B1 and the second battery B2 may be disposed in the rear portion of the vehicle 1, that is, in the rear area.

The first direct-current voltage converter 51 may be disposed between the first battery B1 and the second battery B2 to convert the first voltage of the first battery B1 to the second voltage of the second battery B2. If the second voltage is higher than the first voltage, the first direct-current voltage converter 51 may include a High DC-DC Converter (HDC), and if the second voltage is lower than the first voltage, the first direct-current voltage converter 51 may include a Low DC-DC Converter (LDC).

The electrical devices 40 may receive power from the generator G, the first battery B1, the second battery B2 and/or the first direct-current converter 51, and protect the driver or provide the driver with convenience. Particularly, the first electrical device 40a and the second electrical device 40b may receive power of the first voltage from the first battery B1 and/or the generator G, and the fifth electrical device 40e may receive power of the second voltage from the second battery B2 and/or the first direct-current voltage converter 51.

The power controller 100 may stabilize a voltage value of power that is supplied from the generator G, the first battery B1, the second battery B2, and/or the first direct-current voltage converter 51 to the electrical devices 40.

The power controller 100 may divide the electrical devices 40 into a plurality of groups according to their locations or input voltages, and control operations of the electrical devices 40 belonging to the individual groups according to input voltage values of the electrical devices 40 belonging to the individual groups. For example, the power controller 100 may group the first electrical device 40a and the second electrical device 40b into a first group G1, and group the fifth electrical device 40e into a second group G2.

The power controller 100 may control operations of the first and second electrical devices 40a and 40b belonging to the first group G1 according to fluctuation magnitudes of input voltages of the first and second electrical devices 40a and 40b. For example, if a fluctuation magnitude of an input voltage of any one of the first electrical device 40a and the second electrical device 40b is greater than a reference fluctuation magnitude, the power controller 100 may reduce outputs of the first and second electrical devices 40a and 40b belonging to the first group G1.

Further, the power controller 100 may control operations of electrical devices 40e belonging to the second group G2 according to a fluctuation magnitude of an input voltage of the fifth electrical device 40e. For example, if a fluctuation magnitude of an input voltage of the fifth electrical device 40e is greater than a reference fluctuation magnitude, the power controller 100 may reduce outputs of electrical devices 40e belonging to the second group G2.

Figure 14:
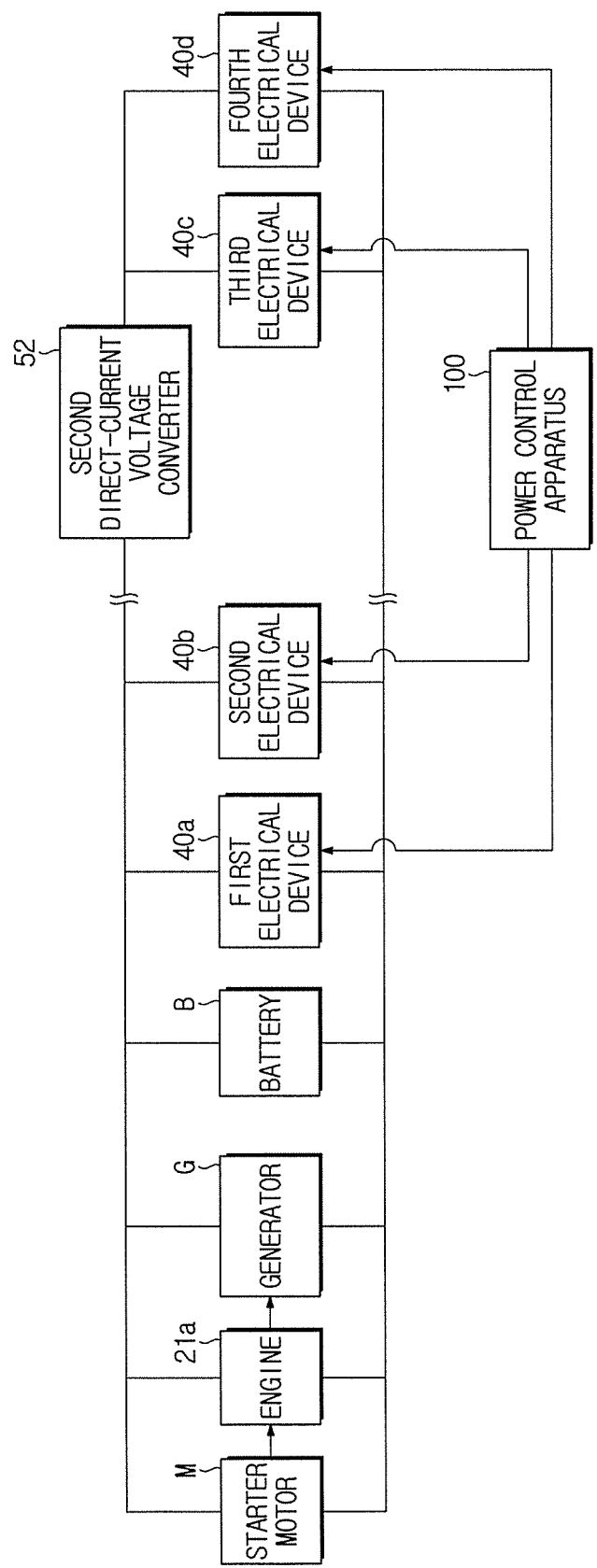
FIG. 14 is a block diagram showing a power system and a power controller of a vehicle according to another embodiment of the present disclosure.

FIG. 14 is a block diagram showing a power system and a power controller of a vehicle according to another embodiment of the present disclosure. The same ones as components shown in FIG. 3 among components shown in FIG. 14 will be assigned the same reference numerals as those assigned to the corresponding components in FIG. 3.

As shown in FIG. 14, the vehicle 1 may include a starter motor M, an engine 21a, a generator G, a battery B, a plurality of electrical devices 40 (that is, a first electrical device 40a, a second electrical device 40b, a third electrical device 40c, and a fourth electrical device 40d), a second direct-current voltage converter 52, and a power controller 100. Compared to FIG. 3, the second direct-current converter 52 may be further provided, and the battery B may be disposed at a different location.

The starter motor M, the engine 21a, and the generator G may be the same as those shown in FIG. 3.

The battery B may store electrical energy, and supply power to the electrical devices 40 of the vehicle 1. Also, the battery B may be located in the front portion of the vehicle 1, that is, in the front area.

The electrical devices 40 may receive power from the generator G and/or the battery B, and protect the driver or provide the driver with convenience. The first electrical device 40a and the second electrical device 40b may be located in the front portion of the vehicle 1, that is, in the front area, and the third electrical device 40c and the fourth electrical device 40d may be located in the rear portion of the vehicle 1, that is, in the rear area.

The second direct-current voltage converter 52 may be disposed between the first and second electrical devices 40a and 40b and the third and fourth electrical devices 40c and 40d to supply power of a converted voltage to the third and fourth electrical devices 40c and 40d.

The third and fourth electrical devices 40c and 40d may receive power from the generator G and/or the battery B located in the front portion of the vehicle 1. Due to resistance of power lines, power consumption of the first and second electrical devices 40a and 40b, etc., when power is sent from the generator G and/or the battery B to the third and fourth electrical devices 40c and 40d, a voltage of power that is supplied to the third and fourth electrical devices 40c and 40d may become lower than a voltage (a reference voltage) of power output from the generator G and/or the battery B.

The second direct-current voltage converter 52 may boost a voltage of power to be supplied to the third and fourth electrical devices 40c and 40d to a voltage (reference voltage) of power output from the generator G and/or the battery B.

The power controller 100 may stabilize a voltage value of power that is supplied from the generator G, the battery B, and/or the second direct-current voltage converter 52 to the electrical devices 40.

The power controller 100 may group the electrical devices 40 into a plurality of groups according to their locations or input voltages, and control operations of the electrical devices 40 belonging to the individual groups according to input voltage values of the electrical devices 40 belonging to the individual groups. For example, the power controller 100 may group the first electrical device 40a and the second electrical device 40b into a first group G1, and group the third electrical device 40c and the fourth electrical device 40d into a second group G2.

The power controller 100 may control operations of the first and second electrical devices 40a and 40b belonging to the first group G1 according to fluctuation magnitudes of input voltages of the first and second electrical devices 40a and 40b. For example, if a fluctuation magnitude of an input voltage of any one of the first electrical device 40a and the second electrical device 40b is greater than a reference fluctuation magnitude, the power controller 100 may reduce outputs of the first and second electrical devices 40a and 40b belonging to the first group G1.

Further, the power controller 100 may control operations of electrical devices 40c and 40d belonging to the second group G2 according to a fluctuation magnitude of an input voltage of any one of the third electrical device 40c and the fourth electrical device 40d. For example, if a fluctuation magnitude of an input voltage of any one of the third electrical device 40c and the fourth electrical device 40d is greater than a reference fluctuation magnitude, the power controller 100 may reduce outputs of electrical devices 40c and 40d belonging to the second group G2.

As described above, the power controller 100 can stabilize a voltage of power that is supplied to the electrical devices 40 in the power systems of the various vehicles 1.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

According to an aspect of the present disclosure, there are provided a vehicle and a power controller capable of stabilizing a voltage of power to be supplied to electric components.

According to an aspect of the present disclosure, there are provided a vehicle and a power controller capable of grouping electric components into a plurality of groups according to locations of the electric components, and stabilizing a voltage of power to be supplied to each group.

According to an aspect of the present disclosure, there are provided a vehicle and a power controller capable of monitoring a voltage of power supplied to each of a plurality of groups, and controlling, when a voltage of a group fluctuates, operations of electric components belonging to the group.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
    a generator;
    a battery;
    a plurality of electrical devices configured to receive power from the generator and the battery; and
    a power controller configured to:
        group the plurality of electrical devices into a plurality of groups based on an electrical connection relationship between the plurality of electrical devices,
        group the plurality of electrical devices into the plurality of groups according to fluctuation magnitudes of input voltage of the plurality of electrical devices, and
        control an operation of an electrical device belonging to a group to which at least one electrical device among the plurality of electrical devices belongs, according to a fluctuation of an input voltage of the at least one electrical device, wherein if a fluctuation magnitude of the input voltage of the at least one electrical device is greater than a reference fluctuation magnitude, the power controller reduces outputs of electrical devices belonging to the group to which the at least one electrical device belongs, wherein the at least one electrical device in which the fluctuation magnitudes of input voltage are greater than the reference fluctuation magnitude is an electrical device that consumes high power for a predetermined time period, and wherein the electrical device that consume high power includes at least one of an electric power steering apparatus, an air conditioner, a heating wire, or a motor.

2. The vehicle according to claim 1, wherein the power controller groups the plurality of electrical devices into the plurality of groups based on locations of the plurality of electrical devices.

3. The vehicle according to claim 1, wherein each of the plurality of electrical devices measures an input voltage applied from the generator and the battery, and transmits information about the input voltage to the power controller.

4. The vehicle according to claim 1, wherein if a fluctuation magnitude of an input voltage of the at least one electrical device is greater than the reference fluctuation magnitude after the power controller reduces the output of the electrical device belonging to the group to which the at least one electrical device belongs, the power controller stops operations of the plurality of electrical devices.

5. The vehicle according to claim 1, wherein if fluctuation magnitudes of input voltages of the plurality of electrical devices are greater than a reference fluctuation magnitude, the power controller stops operations of the plurality of electrical devices.

6. A vehicle comprising:
a first electrical device and a second electrical device belonging to a first group;
a third electrical device belonging to a second group; and
a power controller configured to:
group the first electrical device and the second electrical device into the first group and group the third electrical device into the second group based on an electrical connection relationship between the first electrical device, the second electrical device, and the third electrical device,
group the first electrical device and the second electrical device into the first group and group the third electrical device into the second group, according to fluctuation magnitudes of input voltage of the first electrical device, the second electrical device and the third electrical device, and
collect an input voltage of the first electrical device, and to control operations of the first electrical device and the second electrical device belonging to the first group, according to a fluctuation of the input voltage of the first electrical device, wherein if a fluctuation magnitude of an input voltage of the first electrical device is greater than a reference fluctuation magnitude, the power controller reduces outputs of the first electrical device and the second electrical device belonging to the first group, wherein the first electrical device in which the fluctuation magnitudes of input voltage is greater than the reference fluctuation magnitude is an electrical device that consumes high power for a predetermined time period, and wherein the first electrical device includes at least one of an electric power steering apparatus, an air conditioner, a heating wire, or a motor.

7. The vehicle according to claim 6, wherein the power controller groups the first electronic device and the second electrical device into the first group, and groups the third electrical device into the second group, according to locations at which the first electrical device, the second electrical device and the third electrical device are installed.

8. The vehicle according to claim 6, wherein if a fluctuation magnitude of an input voltage of the first electrical device is greater than the reference fluctuation magnitude after the power controller reduces the outputs of the first electrical device and the second electrical device, the power controller stops operations of the first electrical device, the second electrical device and the third electrical device.

9. The vehicle according to claim 8, wherein the power controller collects input voltages of the second electrical device and the third electrical device, and stops operations of the first electrical device, the second electrical device and the third electrical device if fluctuation magnitudes of the input voltages of the second electrical device and the third electrical device are greater than the reference fluctuation magnitude.

10. The vehicle according to claim 7, wherein each of the first electrical device, the second electrical device and the third electrical device measures an input voltage, and transmits the input voltage to the power controller.

11. A power controller comprising:
a communication device configured to communicate with a plurality of electrical devices installed in a vehicle; and
a controller configured to:
group the plurality of electrical devices into a plurality of groups based on an electrical connection relationship between the plurality of electrical devices,
group the plurality of electrical devices into the plurality of groups according to fluctuation magnitudes of input voltage of the plurality of electrical devices, and
receive an input voltage of at least one electrical device among the plurality of electrical devices through the communication device, and to output an operation control signal for controlling an operation of an electrical device belonging to a group to which the at least one electrical device belongs, according to a fluctuation of the input voltage of the at least one electrical device, wherein if a fluctuation magnitude of the input voltage of the at least one electrical device is greater than a reference fluctuation magnitude, the controller outputs an operation control signal for reducing an output of the electrical device belonging to the group to which the at least one electrical device belongs, wherein the at least one electrical device in which the fluctuation magnitudes of input voltage are greater than the reference fluctuation magnitude is an electrical device that consumes high power for a predetermined time period, and wherein the electrical device that consume high power includes at least one of an electric power steering apparatus, an air conditioner, a heating wire, or a motor.

12. The power controller according to claim 11, wherein the controller groups the plurality of electrical devices into the plurality of groups, based on locations of the plurality of electrical devices.

13. The power controller according to claim 11, wherein if a fluctuation magnitude of an input voltage of the at least one electrical device is greater than the reference fluctuation magnitude after the controller outputs the operation control signal for reducing the output of the electrical device belonging to the group to which the at least one electrical device belongs, the controller outputs an operation control signal for stopping operations of the plurality of electrical devices.

14. The power controller according to claim 11, wherein if a fluctuation magnitude of input voltages of the plurality of electrical devices is greater than a reference fluctuation magnitude, the controller outputs an operation control signal for stopping operations of the plurality of electrical devices.

\* \* \* \* \*